(12) United States Patent
Gardos

(10) Patent No.: US 6,381,364 B1
(45) Date of Patent: *Apr. 30, 2002

(54) CONTENT TEXTURE SENSITIVE PICTURE/VIDEO ENCODER/DECODER

(75) Inventor: Thomas R. Gardos, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,614

(22) Filed: Dec. 31, 1996

(51) Int. Cl.$^7$ ................................................. G06K 9/34
(52) U.S. Cl. ........................ 382/173; 382/232; 382/233
(58) Field of Search .......................... 382/232, 233, 382/234, 235, 236, 237, 238, 239, 240, 248, 250, 173, 176, 180, 108, 128, 166; 375/240.08, 240.1; 358/539, 540, 261.2, 430, 462, 467

(56) References Cited

U.S. PATENT DOCUMENTS

| | | | |
|---|---|---|---|
| 4,941,193 A | * 7/1990 | Barnsley et al. | 382/249 |
| 5,214,507 A | * 5/1993 | Aravind et al. | 348/390.1 |
| 5,394,191 A | * 2/1995 | Sirat et al. | 348/571 |
| 5,561,464 A | * 10/1996 | Park | 375/240.1 |
| 5,815,670 A | * 9/1998 | Iverson et al. | 709/247 |
| 5,915,036 A | * 6/1999 | Grunkin et al. | 382/132 |
| 5,995,651 A | * 11/1999 | Gelenbe et al. | 382/156 |
| 6,201,879 B1 | * 3/2001 | Bender et al. | 382/100 |

OTHER PUBLICATIONS

"Pyramid–Based Texture Analysis/Synthesis", David J. Heeger, James R. Bergen, SIGGRAP 95, Conference Proceedings, Aug. 6–11, 1995, pp. 229–238.

"Pyramid–Based Texture Analysis/Synthesis", David J. Heeger, James R. Bergen, SIGGRAPH 95, Conference Proceedings, Aug. 6–11, 1995, pp. 229–238.

* cited by examiner

Primary Examiner—Bhavesh Mehta
Assistant Examiner—Ali Bayat
(74) Attorney, Agent, or Firm—Blakely, Sokoloff, Taylor & Zafman LLP

(57) ABSTRACT

A picture/video encoder is provided with operating logic for segmenting objects with random texture from objects with structured texture in a picture/video frame, and generating random function parameters for the objects with random texture. Additionally, a picture/video decoder is provided with operating logic for regenerating the natural objects in accordance with the random function parameters provided, and reassembling the regenerated objects with random texture with decoded objects with structured texture to reconstitute the original picture/video frame.

48 Claims, 6 Drawing Sheets

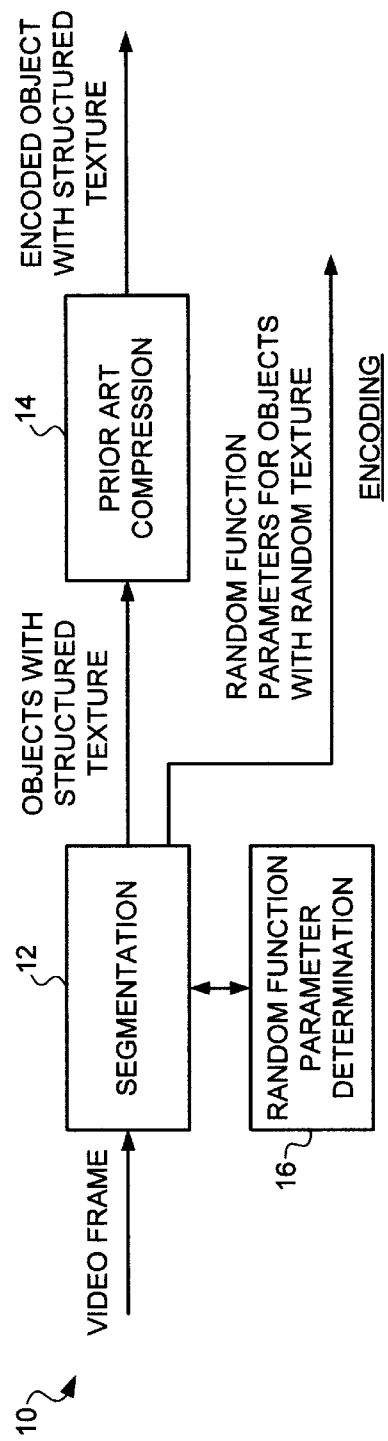
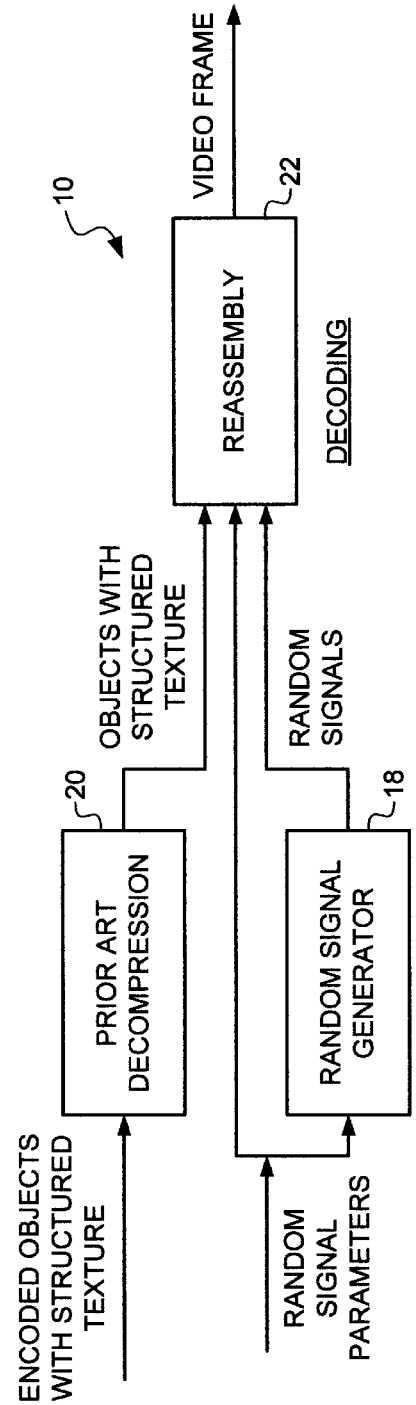

CONTENT TEXTURE SENSITIVE PICTURE/VIDEO ENCODER/DECODER

BACKGROUND OF THE INVENTION

1. Field of the Invention

The present invention relates to the field of picture/video encoding/decoding. More specifically, the present invention relates the art of content sensitive picture/video encoding/decoding.

2. Background Information

A number of picture/video encoding/decoding techniques are known in the art, for examples, the encoding/decoding approaches in accordance with the standards jointly promulgated by the International Standard Organization (ISO) and International Electrotechnical Committee (IEC), formally known as ISO/IEC 11 172 and 13 818, commonly known as MPEG-1 and MPEG-2. In each of their attempts to facilitate subsequent faithful reproduction of the original picture, these prior art approaches typically employ various transformations to eliminate what's considered to be redundant or insignificant picture data. A mean square error type technique is typically employed to minimize the cumulative pixel differences between the reproduced and the original pictures, without any regard to the contents of the picture.

Experience has shown that such pixel difference minimization approach works well for objects with structured texture, such as man-made objects like a table, a chair and so forth. However, for objects with random texture, such as natural objects like a body of water, a field of flowers etc., their visual quality appear to suffer. The reason is because the human eye favors the randomness characteristics in objects with random texture. Thus, pictures that preserve the randomness characteristics for these objects are perceived by the human eyes to be of higher quality. Unfortunately, the prior art imperfect approach of trying to faithfully preserve and reproduce the pixels tend to destroy the randomness characteristics of these objects. Thus, an improved picture/video encoding/decoding technique that takes into account the content texture of the pictures/video frames is desirable.

SUMMARY OF THE INVENTION

A picture/video encoder is provided with operating logic for segmenting objects with random texture from objects with structured texture in a picture/video frame, and generating random function parameters for the objects with random texture. The random function parameters are used subsequently to regenerate the objects with random texture, when reproducing the picture/video frame. In one embodiment, the two types of objects are separated by recursively decomposing each picture/video frame into sub-blocks, separating the random sub-blocks from the non-random sub-blocks. In one embodiment, randomness is measured in accordance with a number of statistical moments determined for each of the sub-blocks. In one embodiment, the statistical moments are output as the random function parameters for subsequent regeneration of the sub-blocks. In another embodiment, noise functions are employed to recursively determine the random function parameters for the random sub-blocks.

Additionally, a picture/video decoder is provided with operating logic for regenerating objects with random texture in accordance with the random function parameters provided, and for reassembling the regenerated objects with random texture with decoded objects with structured texture to reconstitute the original picture/video frame. In one embodiment, the objects with random texture are regenerated by regenerating random sub-blocks, and the original picture/video frame is reconstituted by combining the random sub-blocks with the non-random sub-blocks of the decoded objects with structured texture. In one embodiment, the random sub-blocks are re-determined using random signals and probability density functions in accordance with the provided statistical moments, whereas in another embodiment, the random sub-blocks are regenerated using noise functions in accordance with the function parameters provided.

BRIEF DESCRIPTION OF DRAWINGS

The present invention will be described by way of exemplary embodiments, but not limitations, illustrated in the accompanying drawings in which like references denote similar elements, and in which:

FIGS. 1–2 illustrate one embodiment each of the encoding and decoding aspects of the content sensitive video encoder/decoder of the present invention;

DETAILED DESCRIPTION OF THE INVENTION

Figure 3:
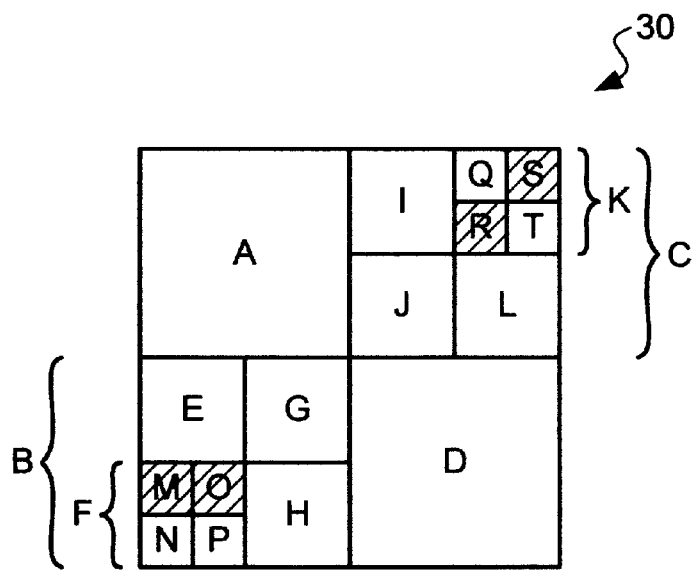
FIGS. 3–4 illustrate one embodiment of an exemplary sub-block approach to segmenting natural objects from man-made objects.

In the following description, for ease of explanation, the present invention will be described in terms of a content texture sensitive video encoder/decoder, however those skilled in the art will appreciate that the present invention may be practice as an encoder/decoder for still pictures also. For the purpose of this application, the term "picture" is intended to include still pictures, video frames, and other like items. Furthermore, various aspects of the content texture sensitive video encoder/decoder will be described. Those skilled in the art will also appreciate that the encoder/decoder may be practiced with only some or all aspects. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified for clarity.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent.

Referring now to FIGS. 1–2, wherein one embodiment each of the encoding and decoding aspects of a content texture sensitive video encoder/decoder of the present invention are shown. As illustrated, video encoder/decoder 10 comprises operating logic for segmenting objects with random texture from objects with structured texture in video frames, during the encoding phase, and operating logic for reassembling the objects with random texture and the objects with structured texture to reconstitute the original picture during the decoding phase. While for ease of explanation, the encoding and decoding aspects are described as two aspects of a video encoder/decoder, those skilled in the art will appreciate that the encoding and decoding aspects of the present invention may be independently practiced.

For the illustrated embodiment, video encoder/decoder 10 includes segmentation function 12, compression function 14, and random function parameter determination function 16. Additionally, video encoder/decoder 10 includes random signal generator 18, decompression function 20, and reassembly function 22. As will be readily apparent from the description to follow, for some embodiments, the present invention may be practiced without random function parameters determination function 16.

For the illustrated embodiment, segmentation function 12 segments the objects with random texture and the objects with structured texture in a video frame by decomposing the video frame into sub-blocks, and segmenting the random sub-blocks from the non-random sub-blocks. The decomposition is performed recursively, resulting in variable size sub-blocks. The underlying sub-block approach to segmentation is also known as the quad-tree approach in the art. Randomness of a sub-block is measured using a number of statistical moments. Compression function 14 compresses the non-random sub-block, i.e., those sub-blocks of objects with structured texture, in accordance with a prior art technique, e.g., MPEG-2. Random function parameter determination function 16 generates random function parameters for the random sub-blocks, i.e., those sub-blocks of the objects with random texture, using noise functions. In an alternate embodiment, the statistical moments employed by segmentation function 12 to measure randomness of a sub-block are output as the "random function parameters" without employing the assistance of random function parameter determination function 16.

Decompression function 20 decompresses the non-random sub-blocks in accordance with a prior art technique, complement to the prior art technique employed to compress the non-random sub-blocks. Random signal generator 18 generates random signals to regenerate the random sub-blocks, using noise functions. Reassembly function 22 reassembles the random and non-random sub-blocks to reconstitute the video frames. In one embodiment, where the encoding phase outputs the statistical moments as the "random function parameters", reassembly function 22 regenerates the random sub-blocks using the white noise generated by random signal generator 18 and probability density functions in accordance with the statistical moments provided. In an alternate embodiment, where the encoding phase outputs random function parameters, reassembly function 22 regenerates the random sub-blocks using the white noise generated by random signal generator 18 and the random function parameters provided.

Figure 4:
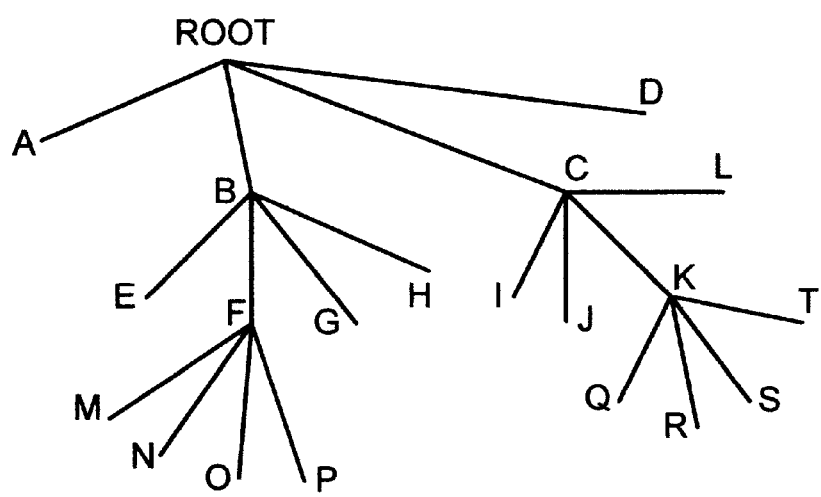

FIGS. 3–4 illustrate one embodiment of the above described exemplary sub-block approach to segmenting objects with random texture from objects with structured texture. FIG. 3 illustrates decomposition of a video frame into sub-blocks, while FIG. 4 illustrates the corresponding data structure. As shown, each video frame 30 is sub-divided into sub-blocks of a first size, blocks A, B, C and D. The randomness of each sub-block is determined, and the sub-blocks are categorized as random or non-random sub-blocks accordingly. The non-random sub-blocks, for the illustrative example, sub-blocks B and C, are further sub-divided into a second smaller size, sub-blocks E, F, G and H, and sub-blocks, I, J, K and L. Again, the randomness of the new smaller sub-blocks are determined, and the new smaller sub-blocks are categorized as random or non-random sub-blocks. The process continues until all the sub-blocks are classified as random sub-blocks or the size of sub-blocks reaches a pre-determined smallest sub-block size. At such time, those sub-blocks that are still characterize as non-random sub-blocks, e.g. sub-blocks N and O, and sub-blocks R and S, are considered to be sub-blocks representative of objects with structured texture, whereas the random sub-blocks, e.g. sub-blocks A, E, N, P, G, H etc., are considered to be sub-blocks representative of objects with random texture.

Figure 5:
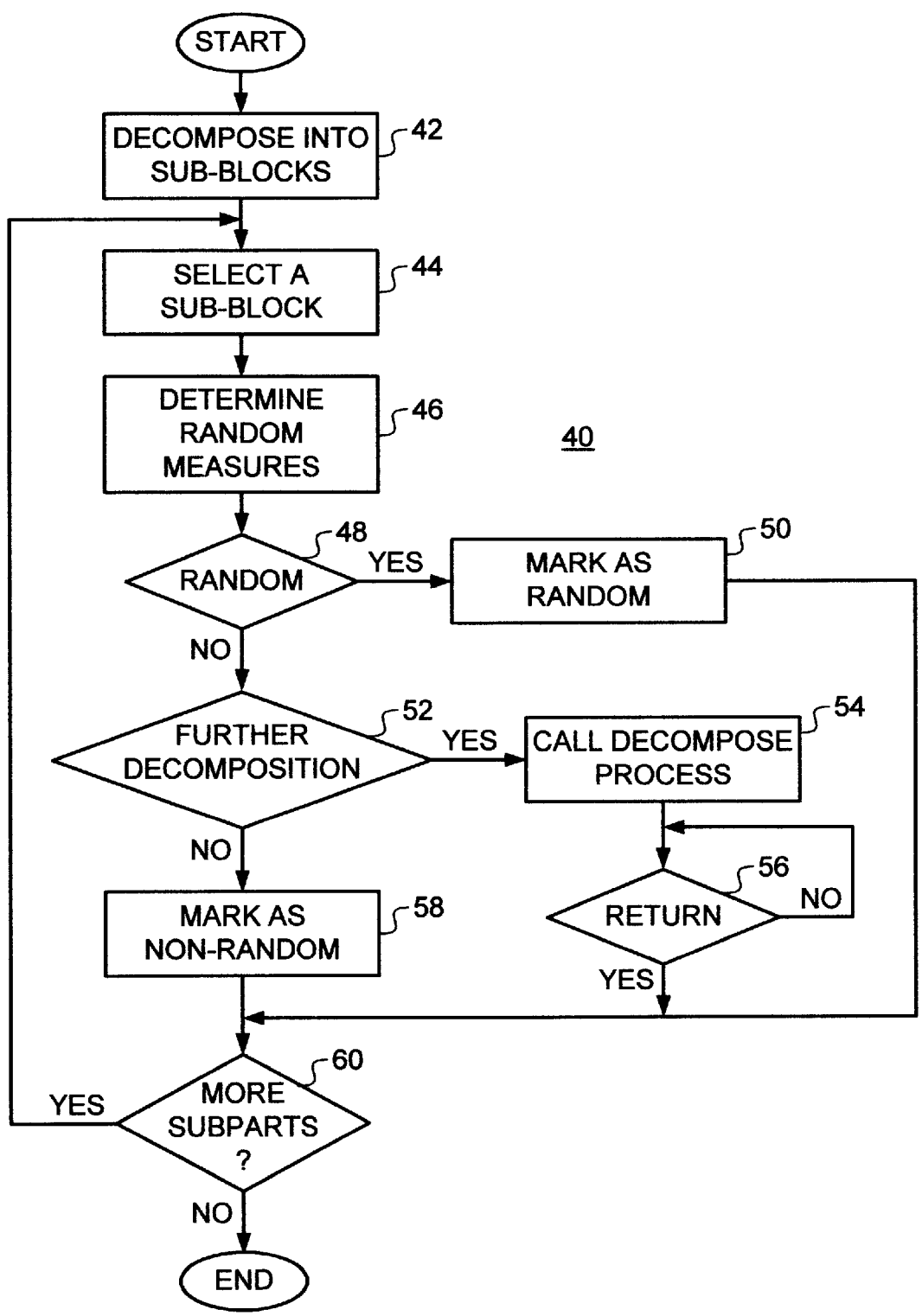
FIG. 5 illustrates one embodiment of the method steps for decomposing a video frame into random and non-random sub-blocks.

FIG. 5 illustrates one embodiment of the method steps for the above described exemplary sub-block approach to segmenting objects with random texture from objects with structured texture. As shown, upon "invocation", the video frame or a sub-block of video frame is (further) decomposed into the next lower size, step 42. Any one of a number of approaches may be employed to govern block size decrement. Once decomposed, one of the sub-blocks is selected for analysis, step 44. Any one of a number of approaches may be employed to govern sub-block selection, including but not limited to the above illustrated top to bottom, then left to right approach. Once selected, the randomness measures are determined for the selected sub-block, step 46. In one embodiment, multiple statistical moments, i.e., means, variance, third moments etc., are employed as randomness measures. Once the random measures are determined, determination is made as to whether the sub-block is a random or a non-random sub-block, step 48.

If the sub-block is a random sub-block, it is so identified, and no further action is taken, step 50. On the other hand if the sub-block is a non-random sub-block, a further determination is made on whether a pre-determined smallest sub-block size has been reached, step 52. If the pre-determined smallest sub-block size has not been reached, decomposition process 40 is recursively invoked to further sub-divide the non-random sub-block and determine if each of its sub-blocks of the next smaller sub-block size is random or non-random, steps 54 and 56.

Eventually, at an invocation level where the pre-determined smallest sub-block size is encountered, the decision of no further decomposition will be reached at step 52. At such time, the sub-block will be marked as a non-random sub-block. A determination is made then as to whether all sub-blocks of that particular level of decomposition has been analyzed, step 60. If one or more sub-blocks of the particular level of decomposition have not been analyzed, the process returns to step 44 for the particular level of decomposition.

Eventually, all sub-blocks of the "deepest" level of decomposition will be analyzed, the process continues at step 60 of the next higher level of decomposition as described earlier. The analysis continues, and "percolates" upward until eventually step 60 of the first level of decomposition is reached, and it is determined that all sub-blocks of the first level of decomposition have been analyzed.

While the present invention is being described with the exemplary sub-block approach to segmenting objects with random texture from objects with structured texture in a picture, those skilled in the art will appreciate that other techniques may be employed. For example, an alternative sub-block approach that sub-divides random sub-blocks until the sub-blocks are either determined to be non-random or the predetermined smallest sub-block size is encountered, may be used instead. In either case, the subsequent compression and random function parameter determination may be performed at a level other than the individual sub-block level. For example, adjacent sub-blocks of like kind may be re-combined into larger regions. Furthermore, a picture may also be recursively analyzed through "growing" regions, i.e. incrementally enlarged regions. The "growing" regions will be analyzed for when their content textures begin to take on randomness characteristics. Any number of approaches known in the art may be employed to govern the size of growth as well as the direction of growth. The random regions may then be represented by transparency or segment masks, and processed. The transparency or segment masks are in turn provided to the receiver of the picture as "side information".

Figure 6:
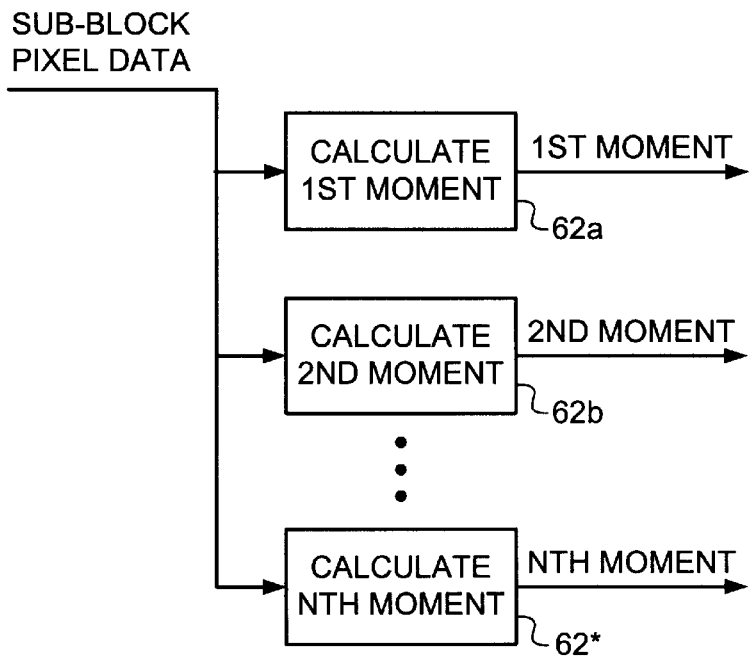
FIG. 6 illustrates one embodiment of an exemplary approach to determining randomness measures.

FIG. 6 illustrates one embodiment for one exemplary approach to determining randomness measures. For the illustrated embodiment, n statistical moment functions 62a–62*  are provided to calculate n statistical moments, i.e. mean, variance, third moments, etc., in parallel. The pixel data of a sub-block are concurrently provided to the n statistical moment functions 62a–62* in parallel. In an alternate embodiment, a single function that calculates these statistical moments in sequence is provided instead. Calculation of statistical moments is known, thus will not be further described.

Figure 7:
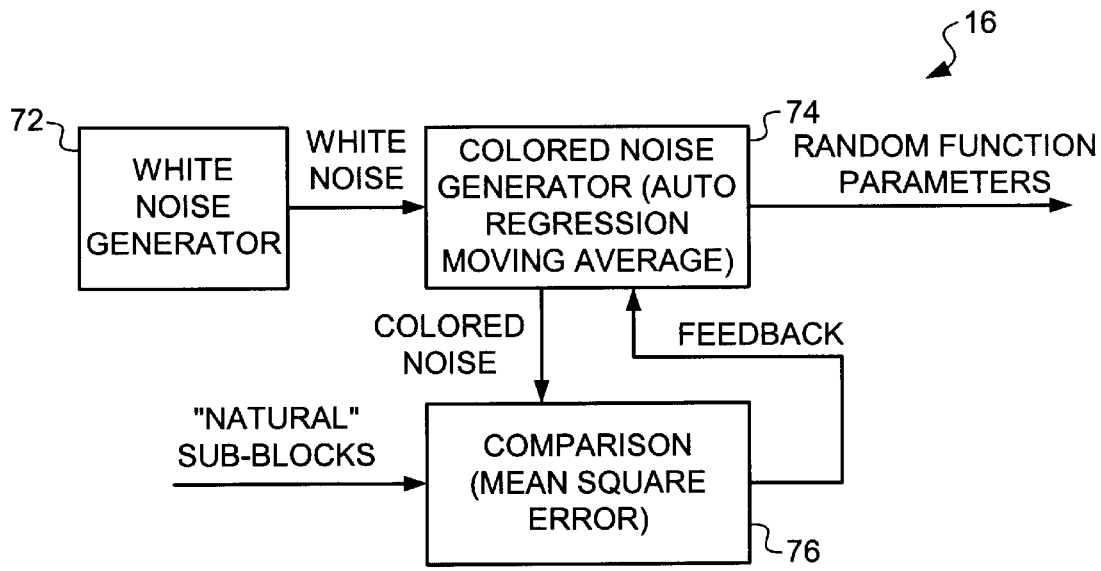
FIG. 7 illustrates one embodiment of an exemplary approach to generating random function parameters.

As described earlier, in some embodiments, the calculated statistical moments are also output as the "random function parameters" for subsequent regeneration of the random sub-blocks. In other embodiments, random function parameter determination function 16 is employed to determine these random function parameters instead. FIG. 7 illustrates one embodiment for one exemplary approach to generating random function parameters. As shown, for the illustrated embodiment, random function parameter determination function 16 includes white noise generator 72, colored noise generation function 74 and comparison function 76. White noise generator 72 generates white noises in accordance with any one of a number of techniques known in the art. Colored noise generation function 74 receives the white noises and transforms them into colored noises. In one embodiment, colored noise function 74 transforms the white noises using an auto regression moving average technique, which is known in the art. The colored noise and the pixel data of the random sub-blocks are provided to comparison function 76, which compares the colored noise to the pixel data, and provides feedback to the colored noise generation function 74 on whether colored noise closely resembles the pixel data of a sub-block. In one embodiment, comparison function 74 employs a conventional mean square error technique to determine whether the colored noise closely resembles the pixel data of a sub-block.

In response to the feedback, colored noise generator 74 adjusts the parameters it uses to transform the white noises into colored noise. For the auto regression moving average embodiment, it adjusts the coefficients of the auto regression moving average function. Eventually, colored noises that closely resemble the pixel data of a sub-block are found, and the parameters employed to transform the white noise are output as the random function parameters. For the auto regression moving average embodiment, the coefficients are returned to segmentation function 12 for output.

Figure 8:
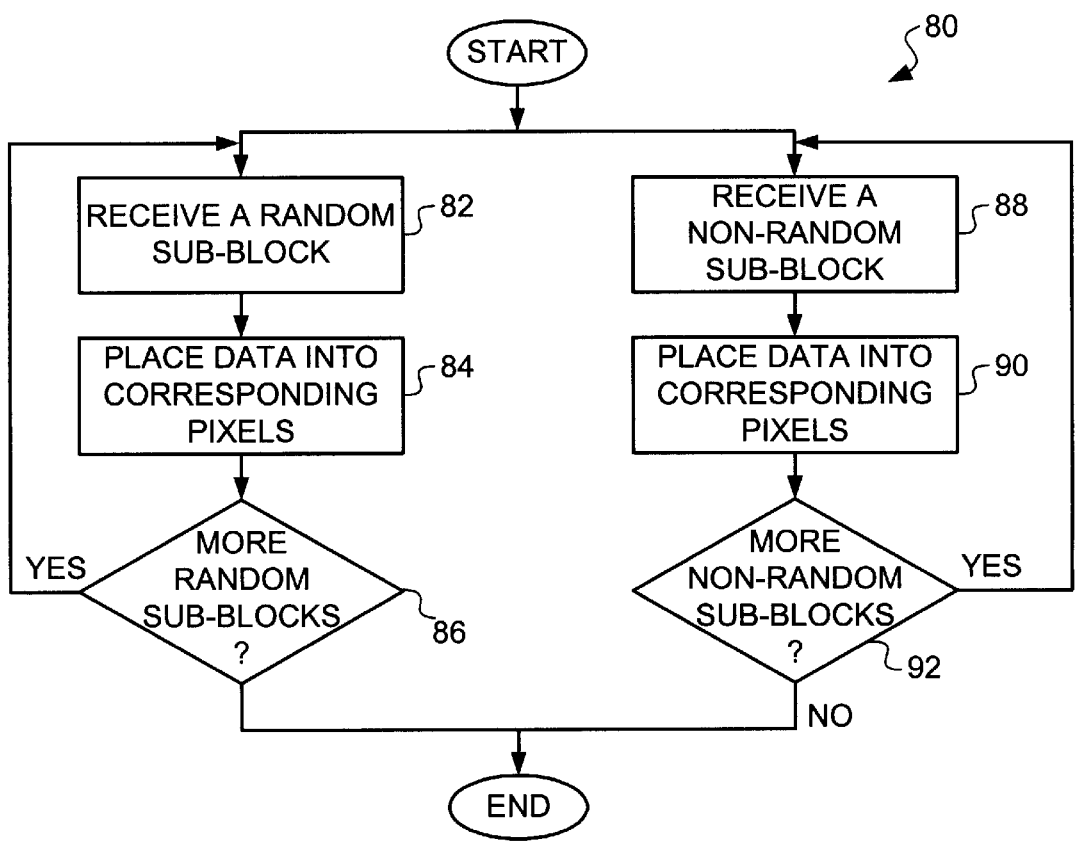
FIG. 8 illustrates one embodiment of the method steps for reassembling the original video frame.

FIG. 8 illustrates one embodiment of the method steps for reassembling the original video frame. As shown, for the illustrated embodiment, reassembly function 22 receives decompressed non-random sub-blocks from decompression function 20, and random signals that resemble corresponding random sub-blocks from random signal generator 18 in parallel, steps 82 and 88. As described earlier, decompression function 20 generates the decompressed non-random sub-blocks in accordance with the complement of the conventional compression technique employed, such as MPEG-2. For the illustrated embodiment, random signal generator 18 generates the random signals using an auto regression moving average function in accordance with the coefficients provided. In an alternate embodiment, random signal generator 18 simply generates white noises.

In each case, reassembly function 22 places the pixel data received for the random/non-random sub-block into the appropriate pixel positions, step 84 and 90. The process continues until all sub-blocks of a video frame have been provided by either decompression function 20 or random signal generator 18, steps 86 and 92.

In an alternate embodiment, at step 82, reassembly function 22 receives statistical moments of the random sub-blocks instead. At step 84, reassembly function 22 further regenerates the pixel data of the random sub-blocks using white noises provided by random signal generator 18 and probability density functions in accordance with the statistical moments provided. The regenerated pixel data are then placed into the appropriate pixel positions.

While the present invention has been described with the above exemplary noise function approaches to generating synthetic texture, other techniques known in the art may also be employed.

Figure 9:
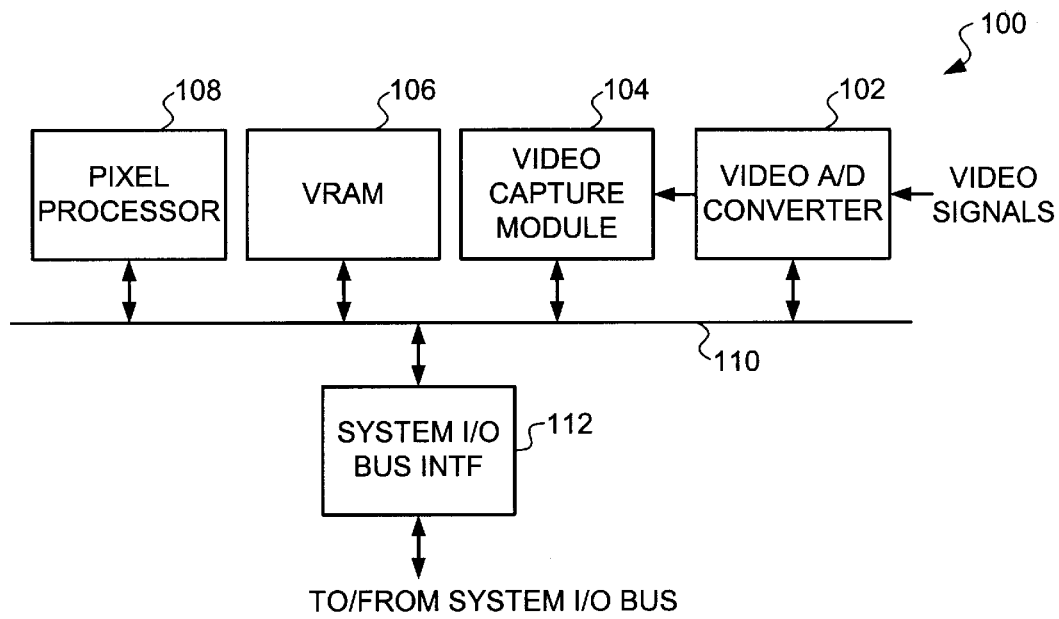
FIG. 9 illustrates one embodiment of a video adapter suitable for practicing the present invention.

FIG. 9 illustrates one embodiment of a video adapter suitable for practicing the present invention. As shown, video adapter 100 comprises video analog-to-digital (A/D) converter 102, video capture module 104, video random access memory 106, pixel processor 108, bus 110, and interface to system input/output (I/O) bus 112, coupled to each other as illustrated. With the exception of video capture module 104, each of these elements 102–112 performs its conventional function known in the art. For video capture module 104, in addition to its conventional functions, which typically includes compression and decompression functions 14 and 20, it is also incorporated with the teachings of the present invention, i.e., segmentation and reassembly functions 12 and 22. For the illustrated embodiment, video capture module 104 further includes random function parameter determination function 16 and random signal generator 18.

Figure 10:
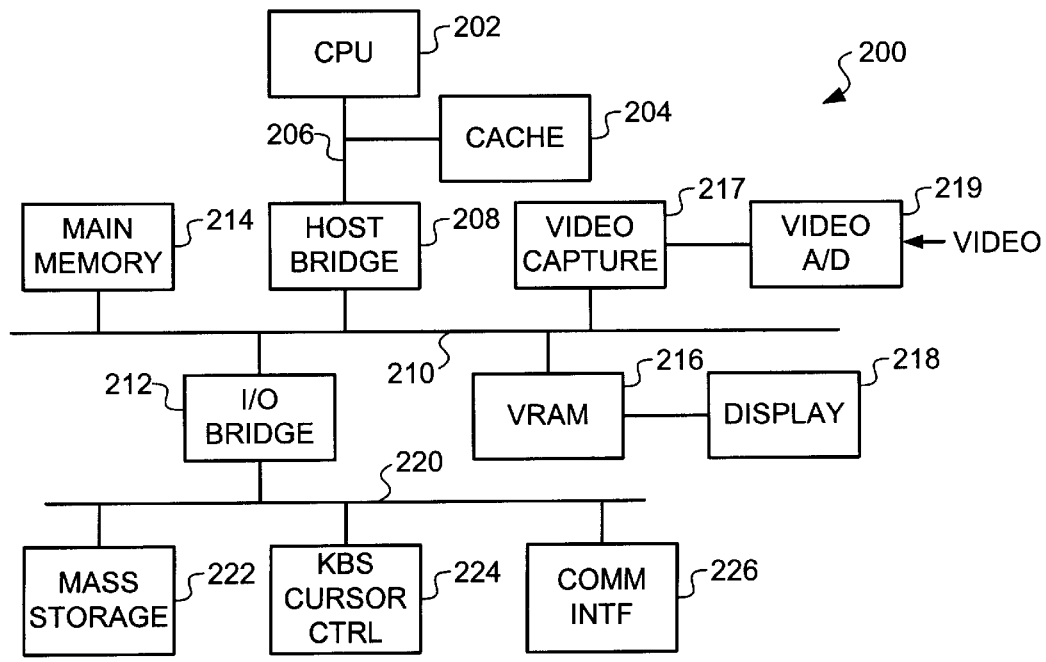
FIG. 10 illustrates one embodiment of a computer system suitable for practicing the present invention.

FIG. 10 illustrates one embodiment of a computer system suitable for practicing the present invention. As shown, for the illustrated embodiment, computer system 200 includes processor 202, processor bus 206, high performance I/O bus 210 and standard I/O bus 220. Processor bus 206 and high performance I/O bus 210 are bridged by host bridge 208, whereas I/O buses 210 and 220 are bridged by I/O bus bridge 212. Coupled to processor bus is cache 204. Coupled to standard I/O bus 220 are disk drive 222, keyboard and pointing device 224 and communication interface 226. Coupled to high performance I/O bus 210 are system memory 214 and video memory 216, against which video display 218 is coupled. Additionally, coupled to high performance I/O bus 220 is video capture module 217, against which video A/D converter 219 is coupled.

These elements perform their conventional functions known in the art, in particular, disk drive 222 and system memory 214 are used to store a permanent and a working copy of segmentation and reassembly functions 12 and 22, and compression and decompression functions 14 and 20. For the illustrated embodiment, disk drive 222 and system memory 214 are also used to store a permanent and a working copy of random function parameter determination function 16 and random signal generator 18. These functions are executed by processor 202 during operation. Except for the teachings of the present invention, constitutions of these elements are known. Any one of a number of implementations of these elements known in the art may be used to form computer system 200 for practice of the present invention.

While the content texture sensitive picture/video encoder/decoder of the present invention has been described in terms of the above illustrated embodiments, those skilled in the art will recognize that the invention is not limited to the embodiments described. The present invention can be practiced with modification and alteration within the spirit and scope of the appended claims. Accordingly, the description is to be regarded as illustrative instead of restrictive on the present invention.

Thus, a content texture sensitive picture/video encoder/decoder has been described.

What is claimed is:

1. An apparatus comprising:
   first operating logic to segregate objects having random texture from objects having structured texture in a picture, and generate random function parameters for the objects having random texture; and
   second operating logic to encode the objects having structured texture.

2. The apparatus as set forth in claim 1, wherein the first operating logic includes operating logic to segment the picture into a plurality of sub-blocks.

3. The apparatus as set forth in claim 1, wherein the first operating logic includes operating logic to determine a plurality of statistical moments for a plurality of sub-blocks of the picture.

4. The apparatus as set forth in claim 3, wherein the first operating logic is coupled to output the determined statistical moments as the random function parameters.

5. The apparatus as set forth in claim 3, wherein the first operating logic further includes logic to generate the random function parameters using noise functions for random sub-blocks of the picture, and determine randomness in accordance with said determined statistical moments of the sub-blocks.

6. The apparatus as set forth in claim 1, wherein the objects having random texture are natural objects, and the objects having structured texture are man-made objects.

7. The apparatus as set forth in claim 1, wherein the picture is a video frame.

8. An apparatus comprising:
   first operating logic to segregate random and non-random sub-blocks of a picture, and generate random function parameters for random sub-blocks; and
   second operating logic to encode the non-random sub-blocks.

9. The apparatus as set forth in claim 8, wherein the first operating logic includes operating logic to determine a plurality of statistical moments for a plurality of sub-blocks of the picture.

10. The apparatus as set forth in claim 9, wherein the first operating logic is coupled to output the determined statistical moments as the random function parameters.

11. The apparatus as set forth in claim 9, wherein the first operating logic further includes logic to generate the random function parameters using noise functions for random sub-blocks of the picture, and determine randomness in accordance with said determined statistical moments of the sub-blocks.

12. The apparatus as set forth in claim 8, wherein the random sub-blocks are sub-blocks of natural objects, and the non-random sub-blocks are sub-blocks of man-made objects.

13. The apparatus as set forth in claim 8, wherein the picture is a video frame.

14. An apparatus comprising:
   a video analog-to-digital converter to receive analog video signals and convert the analog video signals into digital video signals; and
   a video capture module coupled to the video analog-to-digital converter to receive the digital video signals, capture the digital video signals as video frames and encode the video frames, the portion of the video capture module that is to encode the video frames to segment objects having random texture from objects having structured texture in the video frames, and generate random function parameters for the objects with random texture.

15. The apparatus as set forth in claim 14, wherein the video capture module is further to segment each video frame into a plurality of sub-blocks.

16. The apparatus as set forth in claim 14, wherein the video capture module is further to determine a plurality of statistical moments for a plurality of sub-blocks of the video frame.

17. The apparatus as set forth in claim 16, wherein the video capture module is coupled to output the determined statistical moments as the random function parameters.

18. The apparatus as set forth in claim 16, wherein the video capture module is coupled to generate the random function parameters using noise functions for random sub-blocks of the video frames, and determine randomness in accordance with said determined statistical moments of the sub-blocks.

19. The apparatus as set forth in claim 14, wherein the objects having random texture are natural objects, and the objects having structured texture are man-made objects.

20. An apparatus comprising:
   a storage medium having stored therein a plurality of programming instructions to implement an encoding function, the encoding function to segment objects having random texture from objects having structured texture in a picture, and generate random function parameters for the objects having random texture; and
   an execution unit coupled to the storage medium to execute the programming instructions.

21. The apparatus as set forth in claim 20, wherein the video capture module is further designed to segment the picture into a plurality of sub-blocks.

22. The apparatus as set forth in claim 21, wherein the encoding function is further designed to determine a plurality of statistical moments for a plurality of sub-blocks of the picture.

23. The apparatus as set forth in claim 22, wherein the encoding function is coupled to output the determined statistical moments as the random function parameters.

24. The apparatus as set forth in claim 22, wherein the encoding function is designed to generate the random function parameters using noise functions for random sub-blocks of the picture, and determine randomness in accordance with said determined statistical moments of the sub-blocks.

25. The apparatus as set forth in claim 20, wherein the objects having structured texture are man-made objects.

26. The apparatus as set forth in claim 20, wherein the encoding function is a video encoding function, and the picture is a video frame.

27. A method for encoding a picture, the method comprising:
   segmenting objects having random texture from objects having structured texture in the picture; and
   generating random function parameters for the objects having random texture.

28. The method as set forth in claim 27, wherein segmenting objects having random texture from objects having structured texture in the picture comprises segmenting the picture into a plurality of sub-blocks.

29. The method as set forth in claim 28, wherein segmenting objects having random texture from objects having structured texture in the picture further comprises determining a plurality of statistical moments for a plurality of sub-blocks of the picture.

30. The method as set forth in claim 27, wherein generating random function parameters for the objects having random texture comprises outputting the determined statistical moments as the random function parameters.

31. The method as set forth in claim 27, wherein generating random function parameters for the objects having random texture comprises generating the random function parameters using noise functions for random sub-blocks of the picture, and further comprising determining randomness in accordance with said determined statistical moments of the sub-blocks.

32. The method as set forth in claim 27, wherein the objects having random texture are natural objects and the objects having structured texture are man-made objects.

33. The method as set forth in claim 27, wherein the picture is a video frame.

34. An apparatus comprising
   first operating logic to generate random signals; and
   second operating logic to regenerate objects having random texture using the generated random signals and random function parameters, and to recombine the regenerated objects having random texture with objects having structured texture to reconstitute a picture.

35. The apparatus as set forth in claim 34, wherein the random function parameters are statistical moments, and the second operating logic is designed to regenerate the objects having random texture further using probability density functions.

36. The apparatus as set forth in claim 34, wherein the apparatus further comprises third operating logic to generate the objects having structured texture from encoded versions of the objects having structured texture.

37. The apparatus as set forth in claim 34, wherein the objects having random texture are natural objects, and the objects having structured texture are man-made objects.

38. The apparatus as set forth in claim 34, further comprising a video encoding function, and wherein the picture is a video frame.

39. An apparatus comprising:
   a storage medium having stored therein a plurality of programming instructions to implement a decoding function, the decoding function configured to reassemble objects having random texture with objects having structured texture to reconstitute a picture, the objects having random texture being regenerated using random signals and random function parameters; and
   an execution unit coupled to the storage medium to execute the programming instructions.

40. The apparatus as set forth in claim 39, wherein the random function parameters are statistical moments, and the objects having random texture are regenerated further using probability density functions.

41. The apparatus as set forth in claim 39, wherein the objects having structured texture are generated from encoded versions of the objects having structured texture.

42. The apparatus as set forth in claim 39, wherein the objects having random texture are natural objects, and the objects having structured texture are man-made objects.

43. The apparatus as set forth in claim 39, wherein the decoding function is a video decoding function, and the picture is a video frame.

44. A method for decoding a picture, comprising:
   regenerating objects having random texture using random signals and random function parameters; and
   reassembling the regenerated objects having random texture with decoded objects having structured texture to reconstitute the picture.

45. The method as set forth in claim 44, wherein the random function parameters are statistical moments, and regenerating objects having random texture using random signals and random function parameters further includes using probability density functions.

46. The method as set forth in claim 44, wherein regenerating objects having random texture using random signals and random function parameters further comprises generating the objects having structured texture from encoded versions of the objects having structured texture.

47. The method as set forth in claim 44, wherein the objects having random texture are natural objects, and the objects having structured texture are man-made objects.

48. The method as set forth in claim 44, wherein the picture is a video frame.

* * * * *